(12) United States Patent
Franklin et al.

(10) Patent No.: US 12,697,765 B2
(45) Date of Patent: *Aug. 4, 2026

(54) METHODS FOR FORMING ELECTRONIC DEVICES WITH BENT DISPLAY EDGES

(71) Applicant: Apple Inc., Cupertino, CA (US)

(72) Inventors: Jeremy C. Franklin, San Rafael, CA (US); Scott A. Myers, Saratoga, CA (US); Stephen Brian Lynch, Portola Valley, CA (US); John Raff, Menlo Park, CA (US)

( * ) Notice: Subject to any disclaimer, the term of this patent is extended or adjusted under 35 U.S.C. 154(b) by 2023 days.

This patent is subject to a terminal disclaimer.

(21) Appl. No.: 16/251,931

(22) Filed: Jan. 18, 2019

(65) Prior Publication Data

US 2019/0152129 A1 May 23, 2019

Related U.S. Application Data

(63) Continuation of application No. 13/250,666, filed on Sep. 30, 2011, now Pat. No. 10,245,776.

(51) Int. Cl.
| | |
|---|---|
| *G06F 1/16* | (2006.01) |
| *B29C 53/04* | (2006.01) |
| *B29L 31/34* | (2006.01) |

(52) U.S. Cl.
CPC ................ *B29C 53/04* (2013.01); *G06F 1/16* (2013.01); *G06F 1/1601* (2013.01); (Continued)

(58) Field of Classification Search
CPC .............................. G06F 1/1637; G06F 1/1652
See application file for complete search history.

(56) References Cited

U.S. PATENT DOCUMENTS

| | | | | |
|---|---|---|---|---|
| 4,066,855 A | * | 1/1978 | Zenk | .................... H01H 13/702 |
| | | | | 200/512 |
| 4,085,302 A | | 4/1978 | Zenk et al. | |

(Continued)

FOREIGN PATENT DOCUMENTS

| | | |
|---|---|---|
| JP | 2000163031 | 6/2000 |
| JP | 2001060655 | 3/2001 |

(Continued)

OTHER PUBLICATIONS

Martisauskas et al., U.S. Appl. No. 13/229,120, filed Sep. 9, 2011.

(Continued)

*Primary Examiner* — Adrian S Wilson
(74) *Attorney, Agent, or Firm* — Treyz Law Group, P.C.; David K. Cole

(57) ABSTRACT

An electronic device may have a display with a bent portion such as one or more bent edge portions. The display may be formed from a flexible display layer such as an organic light-emitting-diode layer. The organic light-emitting-diode layer may include a substrate layer such as a sheet of polymer. The flexible display may be attached to a support structure such as a flexible support layer using adhesive. To facilitate bending, the display may be heated. Bending and heating equipment may simultaneously heat the display layer and the flexible support layer to form a bent edge portion for the display. The bending and heating equipment may include heated structures for pressing the display layer into a desired shape.

19 Claims, 9 Drawing Sheets

(52) U.S. Cl.
CPC .......... *G06F 1/1633* (2013.01); *G06F 1/1637*
(2013.01); *B29L 2031/3475* (2013.01); *Y10T*
*156/1043* (2015.01)

(56) References Cited

U.S. PATENT DOCUMENTS

| | | | |
|---|---|---|---|
| 5,235,451 A * | 8/1993 | Bryan | G02F 1/13452 |
| | | | 349/149 |
| 5,483,261 A * | 1/1996 | Yasutake | G06V 40/20 |
| | | | 345/173 |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,654,071 B2 * | 11/2003 | Chen | G06F 3/0444 |
| | | | 345/173 |
| 6,690,387 B2 | 2/2004 | Zimmerman et al. | |
| 6,803,245 B2 | 10/2004 | Auch et al. | |
| 7,015,894 B2 | 3/2006 | Morohoshi | |
| 7,034,913 B2 | 4/2006 | Ishida | |
| 7,157,987 B2 | 1/2007 | Brunker et al. | |
| 7,184,064 B2 | 2/2007 | Zimmerman et al. | |
| 7,541,671 B2 | 6/2009 | Foust et al. | |
| 7,663,607 B2 | 2/2010 | Hotelling et al. | |
| 7,767,048 B2 | 8/2010 | Kanbayashi | |
| 7,834,451 B2 | 11/2010 | Lee et al. | |
| 8,716,932 B2 * | 5/2014 | Rappoport | H01L 51/0097 |
| | | | 313/506 |
| 8,724,304 B2 * | 5/2014 | Raff | G06F 1/00 |
| | | | 455/575.1 |
| 8,941,550 B2 | 1/2015 | Whitmore et al. | |
| 9,098,242 B2 * | 8/2015 | Rappoport | G06F 1/1656 |
| 9,178,970 B2 * | 11/2015 | Lynch | G02F 1/133308 |
| 9,256,250 B2 * | 2/2016 | Raff | H04L 1/00 |
| 9,653,806 B2 | 5/2017 | Ying | |
| 9,817,444 B2 * | 11/2017 | Raff | G06F 1/1637 |
| 9,864,403 B2 * | 1/2018 | Franklin | G06F 1/1626 |
| 9,894,781 B2 * | 2/2018 | Franklin | G06F 1/1633 |
| 9,939,699 B2 * | 4/2018 | Park | H01L 27/1218 |
| 10,088,863 B2 * | 10/2018 | Rappoport | G06F 1/1637 |
| 10,228,719 B2 * | 3/2019 | Rappoport | G06F 1/1637 |
| 10,245,776 B2 * | 4/2019 | Franklin | G06F 1/16 |
| 10,691,165 B2 * | 6/2020 | Franklin | G06F 1/1626 |
| 2002/0027636 A1 * | 3/2002 | Yamada | G02F 1/13394 |
| | | | 349/155 |
| 2003/0107549 A1 * | 6/2003 | Lu | G06F 1/169 |
| | | | 345/156 |
| 2004/0069605 A1 * | 4/2004 | Takabatake | G06F 3/041 |
| | | | 200/61.01 |
| 2005/0135724 A1 * | 6/2005 | Helvajian | C03C 10/00 |
| | | | 385/14 |
| 2006/0026521 A1 | 2/2006 | Hotelling et al. | |
| 2006/0197753 A1 | 9/2006 | Hotelling | |
| 2006/0216909 A1 * | 9/2006 | Yamazaki | H01L 27/124 |
| | | | 257/E29.295 |
| 2006/0273304 A1 * | 12/2006 | Cok | H01L 51/524 |
| | | | 438/26 |
| 2008/0227507 A1 * | 9/2008 | Joo | H04M 1/0266 |
| | | | 455/575.8 |
| 2009/0090928 A1 * | 4/2009 | Mori | H05K 3/44 |
| | | | 438/42 |
| 2009/0096965 A1 * | 4/2009 | Nagata | G02F 1/133305 |
| | | | 313/504 |
| 2009/0167171 A1 | 7/2009 | Jung et al. | |

| | | | |
|---|---|---|---|
| 2009/0201635 A1 * | 8/2009 | Kim | H01L 51/0097 |
| | | | 361/679.21 |
| 2009/0256471 A1 | 10/2009 | Kim et al. | |
| 2009/0284904 A1 * | 11/2009 | Wu | G02F 1/133305 |
| | | | 361/679.01 |
| 2010/0061055 A1 * | 3/2010 | Dabov | H04M 1/026 |
| | | | 381/334 |
| 2010/0073593 A1 * | 3/2010 | Sasaki | G02F 1/133308 |
| | | | 349/58 |
| 2010/0103138 A1 * | 4/2010 | Huang | H05K 3/0058 |
| | | | 29/829 |
| 2010/0117975 A1 * | 5/2010 | Cho | G06F 3/0202 |
| | | | 345/173 |
| 2010/0208190 A1 | 8/2010 | Yoshida | |
| 2010/0253902 A1 * | 10/2010 | Yamazaki | G02F 1/133305 |
| | | | 438/30 |
| 2010/0284132 A1 * | 11/2010 | Yi | B29C 45/14688 |
| | | | 361/679.01 |
| 2010/0328223 A1 * | 12/2010 | Mockarram-Dorri | |
| | | | G06F 3/041 |
| | | | 345/173 |
| 2011/0007042 A1 * | 1/2011 | Miyaguchi | H01L 23/562 |
| | | | 345/204 |
| 2011/0019123 A1 * | 1/2011 | Prest | C03C 19/00 |
| | | | 428/192 |
| 2011/0019129 A1 * | 1/2011 | Nishizawa | G02F 1/133308 |
| | | | 349/64 |
| 2011/0050657 A1 * | 3/2011 | Yamada | H01L 27/3293 |
| | | | 361/679.01 |
| 2011/0086680 A1 | 4/2011 | Kim et al. | |
| 2011/0120619 A1 * | 5/2011 | Harada | B29C 65/4835 |
| | | | 156/64 |
| 2011/0261002 A1 * | 10/2011 | Verthein | H04M 1/02 |
| | | | 345/55 |
| 2012/0020056 A1 * | 1/2012 | Yamagata | G02F 1/133305 |
| | | | 361/679.01 |
| 2012/0127087 A1 | 5/2012 | Ma | |
| 2012/0218219 A1 * | 8/2012 | Rappoport | H01L 51/0097 |
| | | | 345/174 |
| 2016/0248148 A1 | 8/2016 | Hill et al. | |
| 2017/0125889 A1 | 5/2017 | Pascolini et al. | |
| 2022/0276672 A1 * | 9/2022 | Franklin | G06F 1/1626 |
| 2022/0345556 A1 * | 10/2022 | Lynch | H04M 1/0268 |

FOREIGN PATENT DOCUMENTS

| | | |
|---|---|---|
| JP | 2002342033 | 11/2002 |
| JP | 2010060866 | 3/2010 |

OTHER PUBLICATIONS

Raff et al., U.S. Appl. No. 13/452,061, filed Apr. 20, 2012.
Myers et al., U.S. Appl. No. 13/108,256, filed May 16, 2011.
Rothkopf et al., U.S. Appl. No. 13/171,295, filed Jun. 29, 2011.
Rothkopf et al., U.S. Appl. No. 13/177,165, filed Jul. 6, 2011.
Lynch, U.S. Appl. No. 13/184,303, filed Jul. 15, 2011.
Chen et al., U.S. Appl. No. 13/186,238, filed Jul. 19, 2011.
Myers et al., U.S. Appl. No. 13/246,510, filed Sep. 27, 2011.
Rappoport et al., U.S. Appl. No. 13/249,734, filed Sep. 30, 2011.
Franklin et al., U.S. Appl. No. 13/250,227, filed Sep. 30, 2011.
Drzaic et al., U.S. Appl. No. 13/252,971, filed Oct. 4, 2011.
Rappoport et al., U.S. Appl. No. 13/273,851, filed Oct. 14, 2011.
Franklin et al., U.S. Appl. No. 13/310,409, filed Dec. 2, 2011.
Franklin et al., U.S. Appl. No. 13/422,724, filed Mar. 16, 2012.
JP 2010060866 English Machine Translation, retrieved Oct. 25, 2012.
JP 2001-060655 English abstract, Mar. 2001.

* cited by examiner

METHODS FOR FORMING ELECTRONIC DEVICES WITH BENT DISPLAY EDGES

This application is a continuation of U.S. patent application Ser. No. 13/250,666, filed Sep. 30, 2011, which is hereby incorporated by reference herein in its entirety. This application claims the benefit of and claims priority to U.S. patent application Ser. No. 13/250,666, filed Sep. 30, 2011.

BACKGROUND

This relates generally to electronic devices, and more particularly, to displays for electronic devices.

Electronic devices often include displays. For example, a cellular telephone or a computer may have a display.

A display for a cellular telephone or computer typically has a rectangular active region containing active display pixels. The display pixels are used to display information for a user. The rectangular active region is generally be surrounded by an inactive border region. The inactive border region can be covered with a cosmetic trim structure such as a bezel or can be covered with a ring of black ink.

The inactive border in a display can be up to a centimeter wide or more. If care is not taken, the size of the inactive border may cause a display to become undesirably large and bulky.

It would therefore be desirable to be able to provide electronic devices with improved displays.

SUMMARY

An electronic device may have a display. For example, a cellular telephone, tablet computer, notebook computer, computer monitor or other electronic device may have a display. One or more of the edges of the display may be bent. For example, a central portion of the display may be maintained in a planar rectangular shape. Peripheral edges of the display may be bent downward away from the central planar portion. The bent edges of the display may form exterior sidewall portions for an electronic device or may be mounted within a device housing. A display may be provided with bent edges to minimize the width of inactive regions of the display.

The display may be formed from a flexible display layer such as an organic light-emitting-diode layer. The organic light-emitting-diode layer may include a substrate layer such as a sheet of polymer. The flexible display and the sheet of polymer that serves as the display substrate may be attached to a support structure such as a flexible support layer using adhesive.

To facilitate bending, the display may be heated. Bending and heating equipment may simultaneously heat the display layer and the flexible support layer to form a bent edge portion for the display. The bending and heating equipment may include heated structures such as heated blocks that are moved using computer-controlled positioners. The heated structures may be used to press the display layer into a desired shape.

Further features of the invention, its nature and various advantages will be more apparent from the accompanying drawings and the following detailed description of the preferred embodiments.

DETAILED DESCRIPTION

Electronic devices may be provided with displays. The displays may include flexible display structures. The flexible display structures may be bent to form bent edges. The use of bent edges in a display may help reduce the size of inactive display border regions.

Figure 1:
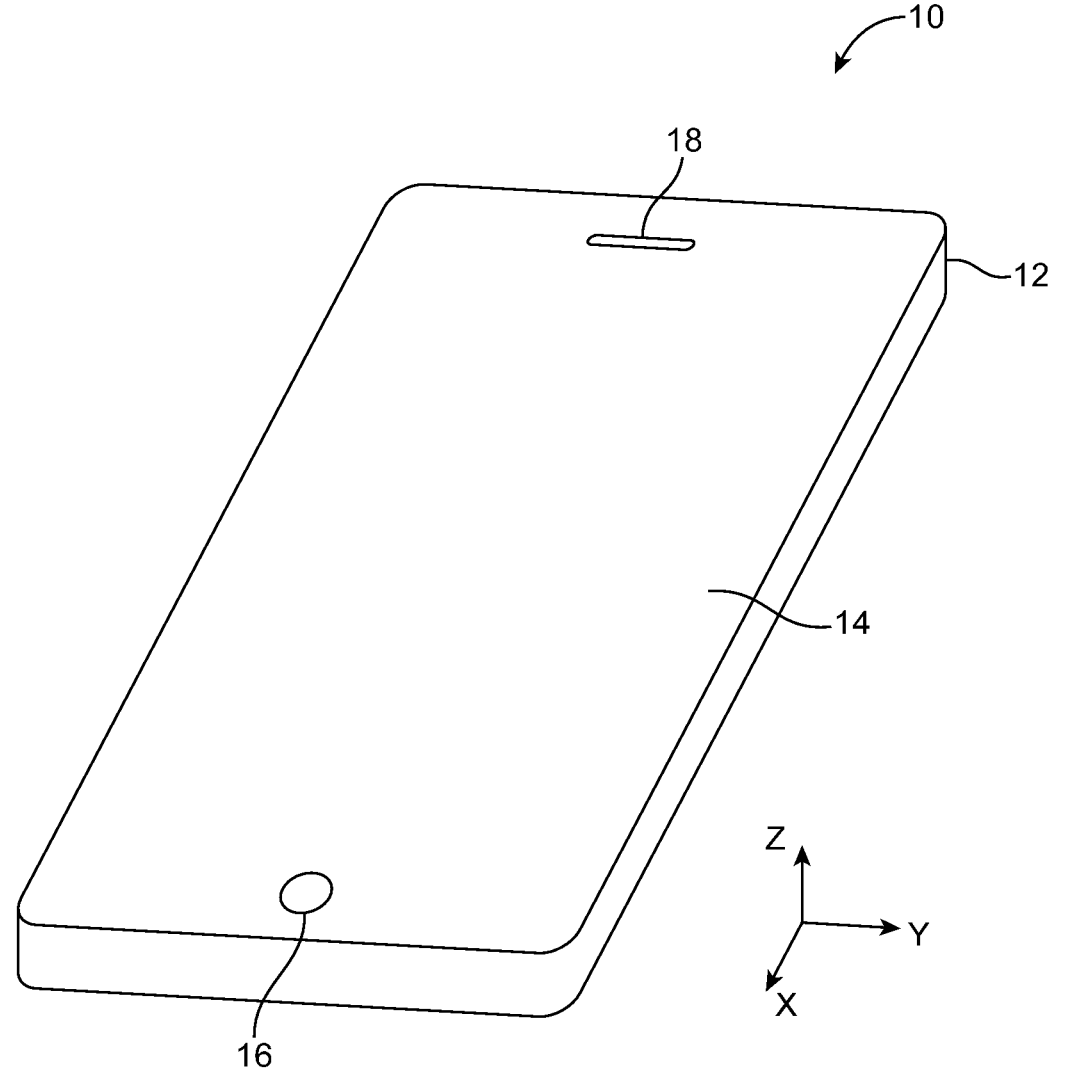
FIG. 1 is a perspective view of an illustrative electronic device with a display in accordance with an embodiment of the present invention.

An illustrative electronic device of the type that may be provided with a display having a bent edge is shown in FIG. 1. Electronic device 10 of FIG. 1 may be a portable computer, a tablet computer, a computer monitor, a handheld device, global positioning system equipment, a gaming device, a cellular telephone, portable computing equipment, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials.

Housing 12 may be formed using an unibody configuration in which some or all of housing 12 is machined or molded as a single structure or may be formed using multiple structures (e.g., an internal frame structure, one or more structures that form exterior housing surfaces, etc.).

In some configurations, housing 12 may be formed using front and rear housing structures that are substantially planar. For example, the rear of device 10 may be formed from a planar housing structure such as a planar glass member, a planar plastic member, a planar metal structure, or other substantially planar structure. The edges (sidewalls) of housing 12 may be straight (vertical) or may be curved (e.g., housing 12 may be provided with sidewalls formed from rounded extensions of a rear planar housing wall).

As shown in FIG. 1, device 10 may have a display such as display 14. Display 14 may, for example, be mounted to the front of device 10. Display 14 may be a touch screen that incorporates capacitive touch electrodes or that incorporates a touch sensor formed using other types of touch technology (e.g., resistive touch, light-based touch, acoustic touch, force-sensor-based touch, etc.). Display 14 may include image pixels formed from light-emitting diodes (LEDs), organic LEDs (OLEDs), plasma cells, electronic ink elements, liquid crystal display (LCD) components, or other suitable display pixel structures.

Device 10 may include input-output ports, buttons, sensors, status indicator lights, speakers, microphones, and other input-output components. As shown in FIG. 1, device 10 may include one or more buttons such as button 16 and may have openings such as an opening for speaker port 18. Device 10 may also have other openings to accommodate input-output ports, speakers, microphones, and other components.

It may be desirable to bend portions of display 14. For example, in designs in which the size of inactive display border regions are to be minimized, it may be desirable to bend the peripheral edges of display 14. The bent edges of display 14 may help hide inactive edge portions of display 14 from view and may help reduce the width of the display border. In other designs, bent portions of display 14 may include active display pixels.

To facilitate bending, display 14 may include flexible structures. For example, display 14 may include one or more layers of flexible materials such as polymers. As an example, display 14 may be a flexible display that contains flexible polymer sheets such as one or more sheets of polyimide and other flexible materials. To enhance display flexibility and thereby facilitate bending of the display, a flexible display may be heated. The heating process may help soften polymers and other materials in the flexible display. If desired, structures associated with display 14 (e.g., display layers and/or support structures for display 14) may be formed from rigid materials that soften and become flexible upon heating. When cooled, flexible display layers of this type may harden and become more rigid.

Regardless of the type of flexible display layers that are used in display 14, peripheral portions of these layers may be bent to form bent edges. If, for example, display 14 has a rectangular shape of the type shown in FIG. 1, the flexible display layers of display 14 may be bent along one of the edges of the display, along two of the edge of the display, along three of the edges of the display, or along all four of the edges of the display. Bent edges may be bent downwards at angles of about 90° (as an example). If desired, bends with other bend angles and bends with more complex shapes may be formed.

Figure 2:
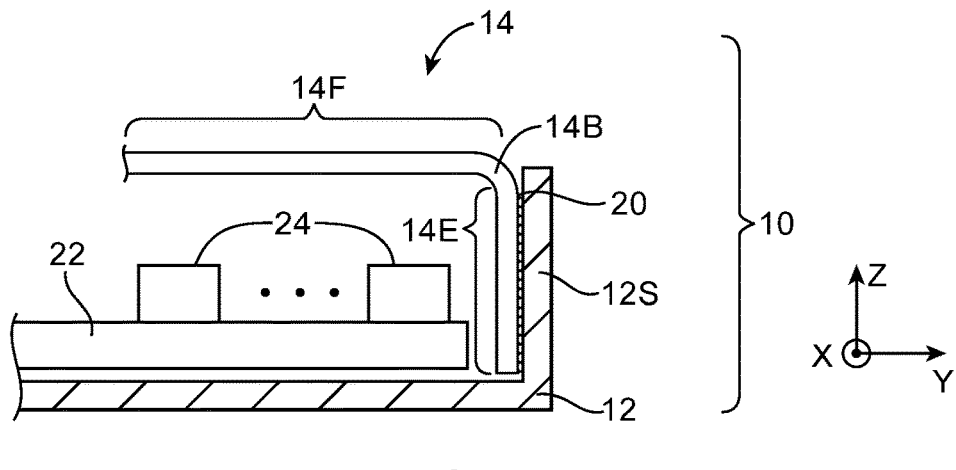
FIG. 2 is a cross sectional side view of a display with a bent border that is mounted within a housing sidewall in an electronic device in accordance with an embodiment of the present invention.

The bent edges of display 14 may be mounted on the inside of housing 12 or the outside of housing 12 or may otherwise be mounted in device 10. FIG. 2 is a cross-sectional side view of a portion of device 10 near one of its peripheral edges (e.g., the right-hand edge of display 14 of FIG. 1). As shown in FIG. 2, display 14 may have a planar front portion such as planar front portion 14F. Internal electrical components 24 may be mounted within housing 12 (e.g., on a printed circuit board such as printed circuit board 22 or other suitable substrate). Planar front portion 14F may have a rectangular shape and may lie in the X-Y plane. Front portion 14F may extend across some or all of the front face of device 10. Front portion 14F may contain active display pixels and may be used in displaying information for a user of device 10. If desired, front portion 14F may have a convex or concave surface shape. The illustrative arrangement of FIG. 2 in which front portion 14F has a planar shape is merely an example.

The edges of display 14 such as bent edge 14E may be bent downwards (inwardly) along bend 14B at a non-zero angle with respect to the X-Y plane that contains front planar portion 14F. In the illustrative example of FIG. 2, bent edge portion 14E of display 14 has been bent downwards from main planar front portion 14F at an angle of about 90°. Other bend angles (e.g., angles more than 90° or angles less than 90° may be used if desired).

As shown in FIG. 2, bend edge portion 14E of display 14 may be attached to the inner surface of housing sidewall 12S. Adhesive 20 may be interposed between the outermost surface of display edge portion 14E and the innermost surface of housing sidewall 12S. Other arrangements may be used for attaching display 14 to housing 12, if desired. For example, display 14 may be attached to housing 12 using screws or other fasteners, engagement structures such as clips and mating snaps, or other suitable attachment mechanisms.

Figure 3:
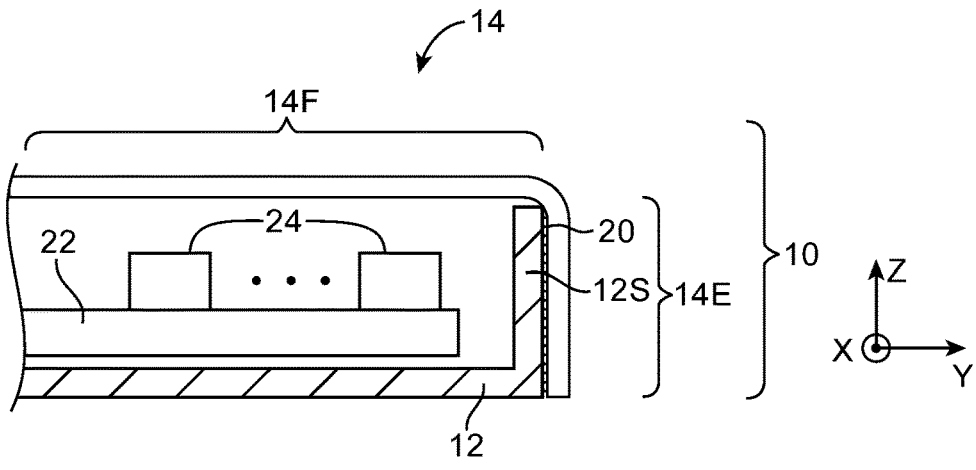
FIG. 3 is a cross-sectional side view of a display with a bent border that is mounted over a housing sidewall in an electronic device in accordance with an embodiment of the present invention.

In the example of FIG. 3, bent display edge 14E has been attached to the outside surface of housing sidewall 12S using adhesive 20. Other attachment mechanisms may be used in attaching bent edge portion 14E to housing 12 or may be used in attaching display 14 and/or bent edge portion 14E to other support structures. The arrangement of FIG. 3 is merely illustrative.

In the configurations of FIGS. 2 and 3, housing sidewalls 12S are substantially vertical and lie in the X-Z plane. Housing structures such as sidewalls 12S may have other shapes, if desired. For example, sidewalls 12S may be curved and may extend smoothly upwards from a planar rear surface of housing 12.

Figure 4:
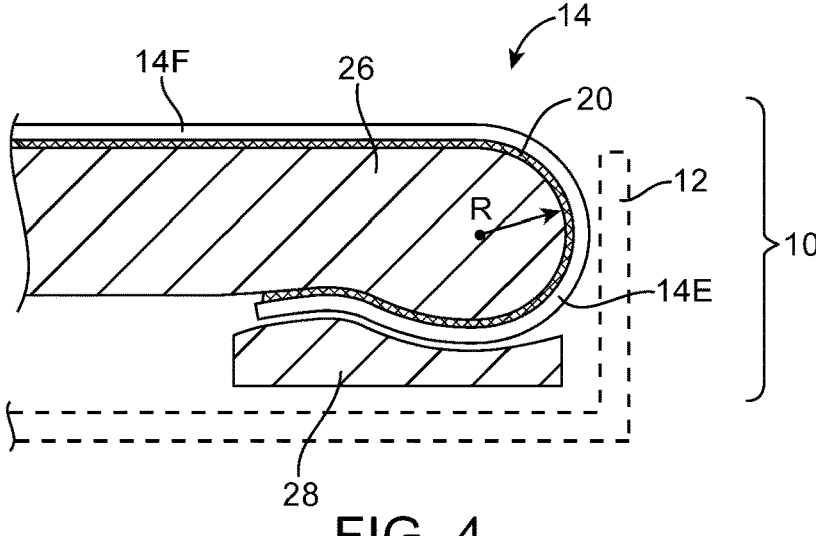
FIG. 4 is a cross-sectional side view of a display with a bent border that is held in place on a support structure with a curved edge surface using a clamp structure in accordance with an embodiment of the present invention.

As shown in FIG. 4, edge portion 14E of display 14 may be wrapped around a support structure such as support structure 26. Support structure 26 may be formed from a material such as plastic, metal, a fiber-composite material, ceramic, other materials, or combinations of these materials. The edge of support structure 26 may be curved. For example, support structure 26 may be characterized by a minimum bend radius R. The size of bend radius R may be selected to prevent damage to flexible display 14. For example, the size of R may be 1 mm, 2 mm, less than 3 mm, less than 2 mm, less than 1 mm, or less than 0.5 mm (as examples). Display 14 may be, for example, an organic light-emitting-diode display and may have a thickness of less than 100 microns (as an example). As described in connection with FIG. 1, the use of an organic light-emitting diode display for forming display 14 in device 10 is illustrative. Other types of display technology may be used in forming display 14, if desired.

With a configuration of the type shown in FIG. 4, display 14 may be mounted in housing 12 by first attaching planar portion 14F to a corresponding planar portion of support structure 26 or other planar support. For example, planar portion 14F of display 14 may be attached to support structure 26 using adhesive 20. Following attachment of planar portion 14F to support structure 26, edge portion 14E may be bent around the curved outer edge of support structure 26. Because support structure 26 has a curved surface that is characterized by a radius of curvature R, the bend radius for bent edge portion 14E of display 14 will be equal to R. Adhesive may be used in attaching edge portion 14E to support structure 26. Additional attachment features such as illustrative clamp structure 28 may be used to clamp or otherwise secure edge portion 14E to support structure 26.

Housing 12 may be used to enclose the edge of display 14, as illustrated by dashed lines 12 in FIG. 4. If desired, the curved edge of display edge portion 14E may be left uncovered by housing structures (e.g., housing sidewall portions of housing 12 may be omitted so that housing 12 does not overlap edge portion 14E of display 14).

Display 14 may be formed from a flexible display layer such as an organic light-emitting diode layer or other layer that may be bent to form edges 14E. The structures that form display 14 (e.g., a display layer such as an organic light-emitting diode layer) may contain multiple sublayers (e.g., a substrate layer formed from polyimide or a sheet of another polymer, a layer of thin-film-transistor structures and interconnect lines, a layer of organic emissive material, a layer of encapsulant, etc.). These sublayers are sometimes depicted as forming a single display layer to avoid over-complicating the drawings.

Flexible displays may be relatively thin. For example, an organic light-emitting-diode display may have a polymer substrate layer, thin-film transistors, an organic emissive layer, and a sealing layer having a total thickness of 100 microns or less (as an example). To facilitate the formation of a display bend such as display bend 14B (FIG. 2) or the bends of FIG. 3 or 4 with a small bend radius, it may be desirable to apply heat to display 14 to help soften display 14 during the bending process.

The application of heat may help one or more of the sublayers of a flexible display to bend without incurring damage. For example, a polymer substrate layer and a polymer sealing layer may be better able to bend without damage when these layers are raised to an elevated (greater than 20° C.) temperature. To avoid damaging the display, it may be desirable to limit the maximum temperature to which the display is exposed. For example, it may be desirable to restrict the elevated temperature to a value of about 85° C. or less, 75° C. or less, or 65° C. or less (as examples). Examples of suitable temperature ranges to which the temperature of display 14 may be elevated during bending are 20-85° C., 30-85° C., 40-80° C., and 60-85° C.

Figure 5:
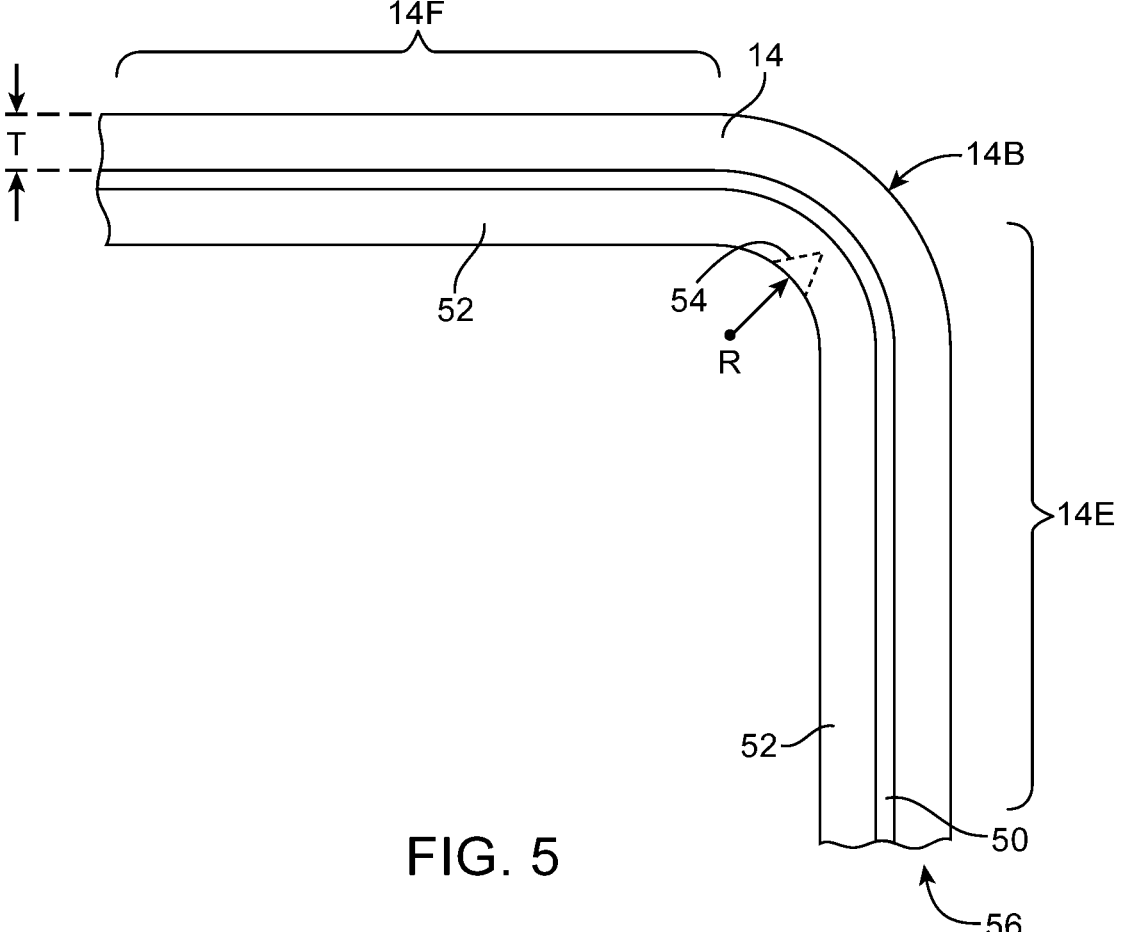
FIG. 5 is a cross-sectional side view of a bent flexible display having a display layer attached to a support layer using adhesive in accordance with an embodiment of the present invention.

To help support the relatively thin structures of an organic-light-emitting diode display or other thin display layer, it may be desirable to support the display layer with a support structure layer. A flexible sheet of polymer or other suitable thin support layer may, for example, be attached to the underside of a display layer. As shown in FIG. 5, for example, a display such as a flexible organic-light-emitting-diode display or other flexible display layer 14 may be attached to a support layer such as support layer 52 using adhesive 50 or other suitable attachment mechanisms. In the resulting multi-layer structure (e.g., layer 56 of FIG. 5), the presence of support layer 52 may help prevent damage to display 14 when bent.

Support layer 52 may be formed from a single material (e.g., a layer of polymer, a layer of metal, or other suitable material), or may be formed from multiple materials (e.g., multiple layers of polymer, multiple layers of metal, multiple layers of polymer and metal, multiple layers of other materials and combinations of materials). Illustrative configurations for support layer 52 that are formed from a single material such as a single polymer are sometimes described herein as an example. In general, however, support layer 52 may include one or more layers of one or more different types of material and may be formed in non-planar support structure shapes.

If desired, portions of support structure 52 may be removed in the vicinity of bend 14B, as illustrated by optional notch 54. The selective removal of some of support layer 52 under bend 14B may facilitate the formation of a bend with a small bend radius R in display 14.

Due to the support provided to display layer 14 by support layer 52, the thickness T of display layer 14 may, if desired, be reduced. For example, a substrate layer for display 14 such as a polyimide substrate layer or other polymer layer may have a reduced thickness (e.g. a thickness of less than 50 microns or less than 25 microns). The total thickness T of flexible display 14 may be less than 70 microns, less than 50 microns, or less than 30 microns (as examples).

The material of support layer 52 may, if desired, be a material that softens at a temperature below the temperature at which display layer 14 is damaged. For example, the material of support layer 52 may be formed from a polymeric material such as a heat shrink polymer that is configured to deform and soften significantly at a temperature of about 30-75° C. or 30-85° C., whereas the polyimide or other polymer layers of display 14 may be less affected (e.g., significantly less affected) by the application of an elevated temperature in this range.

Figure 6:
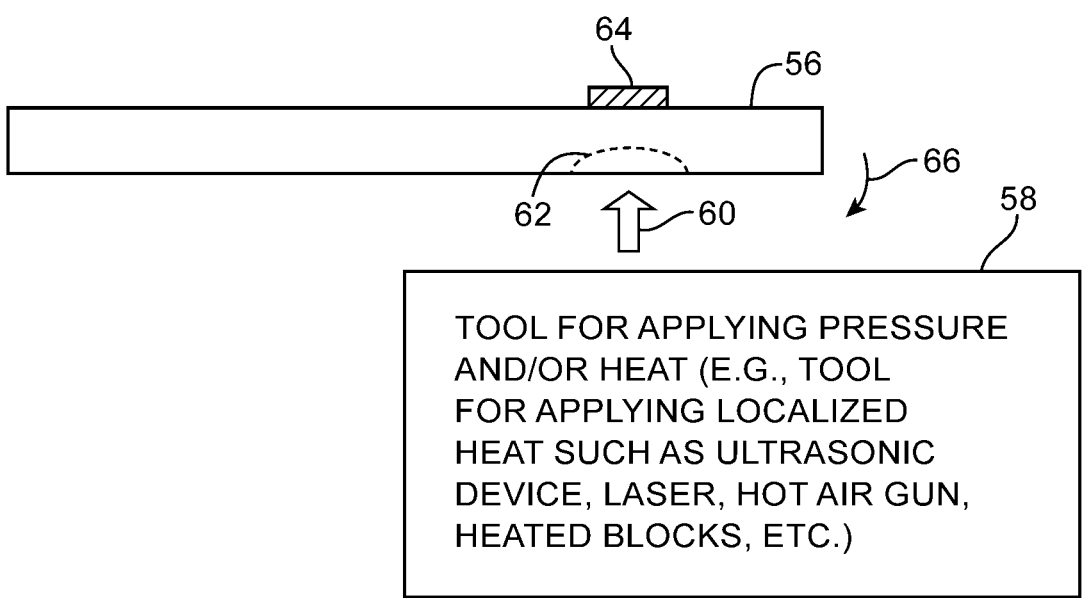
FIG. 6 is a diagram showing how equipment for applying heat and pressure may be used in forming a bend in a display for an electronic device in accordance with an embodiment of the present invention.

Displays with bent portions may be formed using heating and bending equipment such as equipment 58 of FIG. 6. Equipment 58 may be used to apply energy 60 to layer 56 that heats layer 56. Layer 56 may include flexible display layer 14 and optional support structure layer 52 (and optional adhesive 50).

Mechanical tools in equipment 58 may be used to bend layer 56. Bending equipment may include blocks formed from metal, polymer, ceramic, glass, or other materials. The blocks may have planar and/or curved surfaces. Layer 56 may be bent when layer 56 is compressed between opposing structures such as blocks or other structures with planar and/or curved surfaces.

To facilitate bending, energy may be applied to layer 56 to help heat layer 56 to an elevated temperature. Equipment 58 may include a laser or other light source (e.g., an infrared lamp, etc.) that applies energy 60 to layer 56 in the form of light (e.g., visible light, infrared light, etc.), a radio-frequency signal generator that applies energy 60 to layer 56 in the form of radio-frequency electromagnetic signals, a hot air gun or other heat source that provides energy 60 to layer 56 in the form of heated air or a heated liquid, a heated member such as a metal block that provides energy 60 to layer 56 by direct heat transfer from the heated member to layer 56, or an ultrasonic signal generator that provides energy 60 to layer 56 in the form of acoustic signals that are applied directly or via a resonant interaction with resonant structure 64.

Heat may be applied globally to all of layer 56 or may be applied locally in region 62. Local heat may be applied by heating a heated member such as a heated block in a particular location, may be applied by focusing a laser or other light source onto region 62, may be applied by directing radio-frequency electromagnetic signals from a radio-frequency signal source onto region 62, may be applied by placing resonant structure 64 and/or the tip of an ultrasonic signal generator in the vicinity of region 62, may be applied by directing hot air or other heated material locally onto region 62 from a heated material source such as a hot air gun, or may otherwise be localized onto a region such as region 62 of layer 56.

Once heated (or prior to or during heating), layer 56 may be bent in direction 66 in the vicinity of region 62 to create a display having main region 14F (e.g., a planar region) and bent edge portions such as portion 14E. During heating, the heat-shrink polymer or other material in support layer 52 and/or other polymers and materials in layer 56 may soften sufficiently to facilitate bending and may thereby help form a small bend radius R at bend 14B of display 14.

Figure 7:
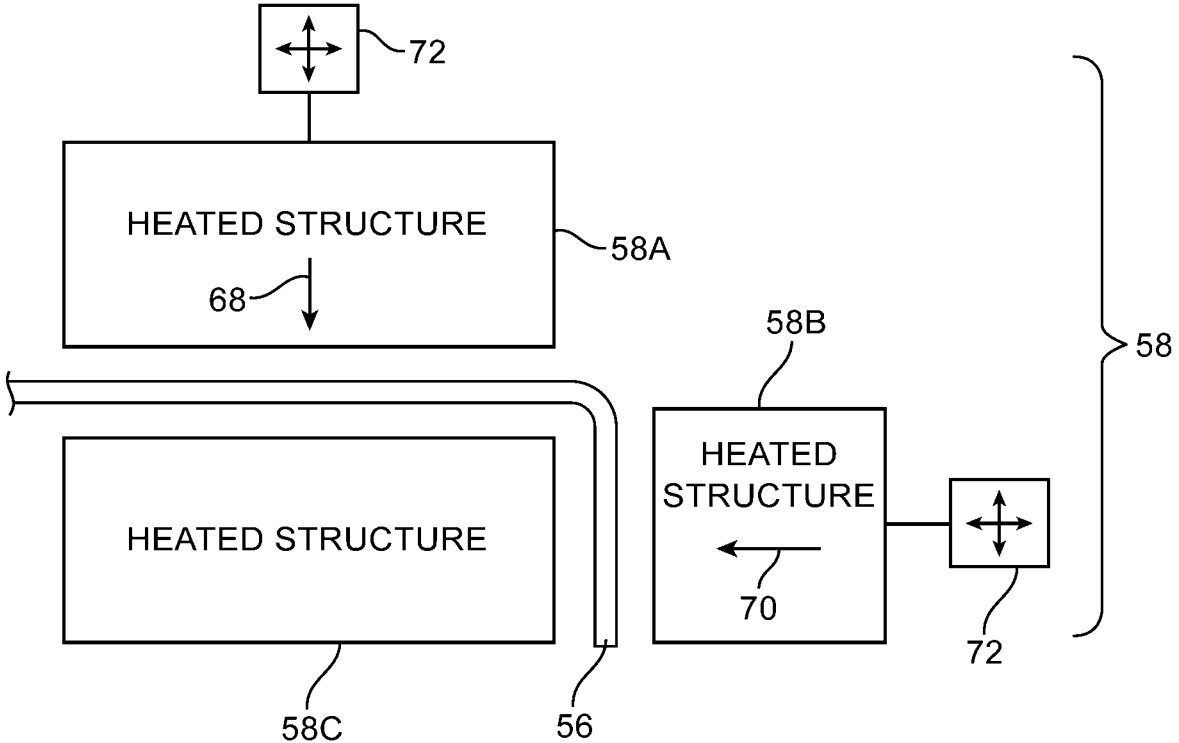
FIG. 7 is a cross-sectional side view of an illustrative tool with heated structures such as a pair of heated blocks that may be used to apply heat and pressure to bend the edge of a flexible display in accordance with an embodiment of the present invention.

FIG. 7 is a side view of illustrative bending and heating equipment 58 being used to bend layer 56. As described in connection with FIG. 5, layer 56 may include display 14 (e.g., a flexible organic light-emitting-diode layer), optional adhesive layer 50, and optional support layer 52. As shown in FIG. 7, equipment 58 may include heated structures such as stationary heated member 58C (e.g., a heated mandrel) and moving heated members 58A and 58B (e.g., heated blocks for pressing against heated member 58C). During operation, heated member 58A may be moved in direction 68 and heated member 58B may be moved in direction 70. Computer-controlled actuators such as positioners 72 may be used in moving members 58A and 58B so that members 58A and 58B press against layer 56. By heating layer 56 while manipulating layer 56 with the structures of equipment 58, layer 56 may be heated and bent along bend 14B, thereby forming a bent edge region such as bent edge region 14E for display 14.

Figure 8:
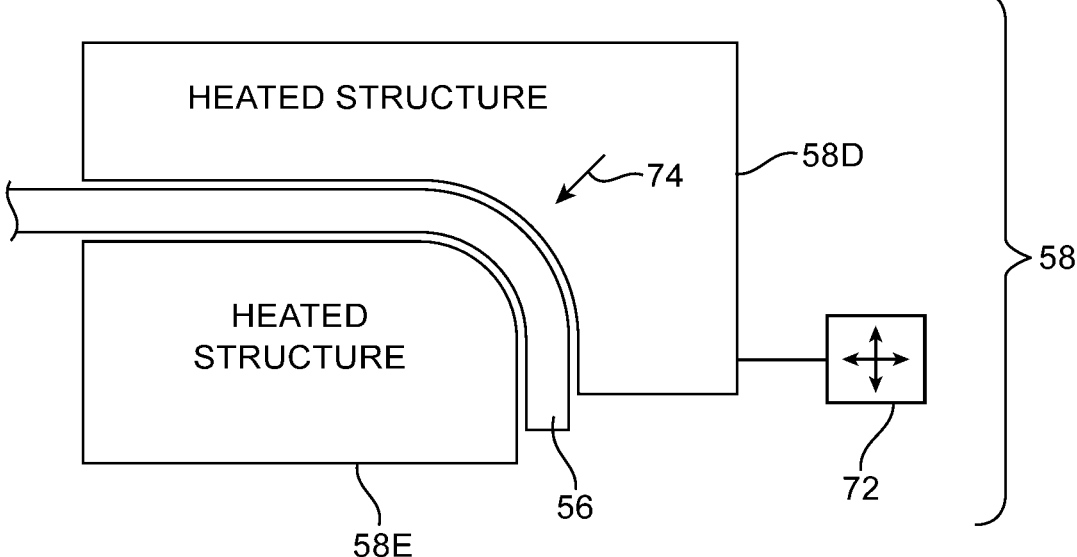
FIG. 8 is a cross-sectional side view of an illustrative tool with heated structures such as an angled heated block that may be used to apply heat and pressure to bend the edge of a flexible display in accordance with an embodiment of the present invention.

FIG. 8 is a side view of illustrative bending and heating equipment 58 that includes a heated block with an angled portion that is being used to bend layer 56. As described in connection with FIG. 5, layer 56 may include display 14 (e.g., a flexible organic light-emitting-diode layer), optional adhesive layer 50, and optional support layer 52. As shown in FIG. 8, equipment 58 may include stationary heated member 58E (e.g., a heated mandrel) and moving heated member 58D (e.g., a heated block of metal or other material having an L-shaped cross-sectional shape). During operation, heated member 58D may be moved in a direction such as direction 74 while heated member 58E is held stationary (as an example). A computer-controlled actuator such as positioner 72 may be used in moving member 58D so that member 58D presses against layer 56. As with illustrative bending and heating equipment 58 of FIG. 7, equipment 58 of FIG. 8 may be used to heat and bend layer 56 along bend 14B of display 14, thereby forming a bent edge region such as bent edge region 14E for display 14. The pressure exerted by structure 58D against structure 58E may help bend layer 56 to a desired shape (e.g., a display with a bent edge and a bent portion having a small bend radius).

Figure 9:
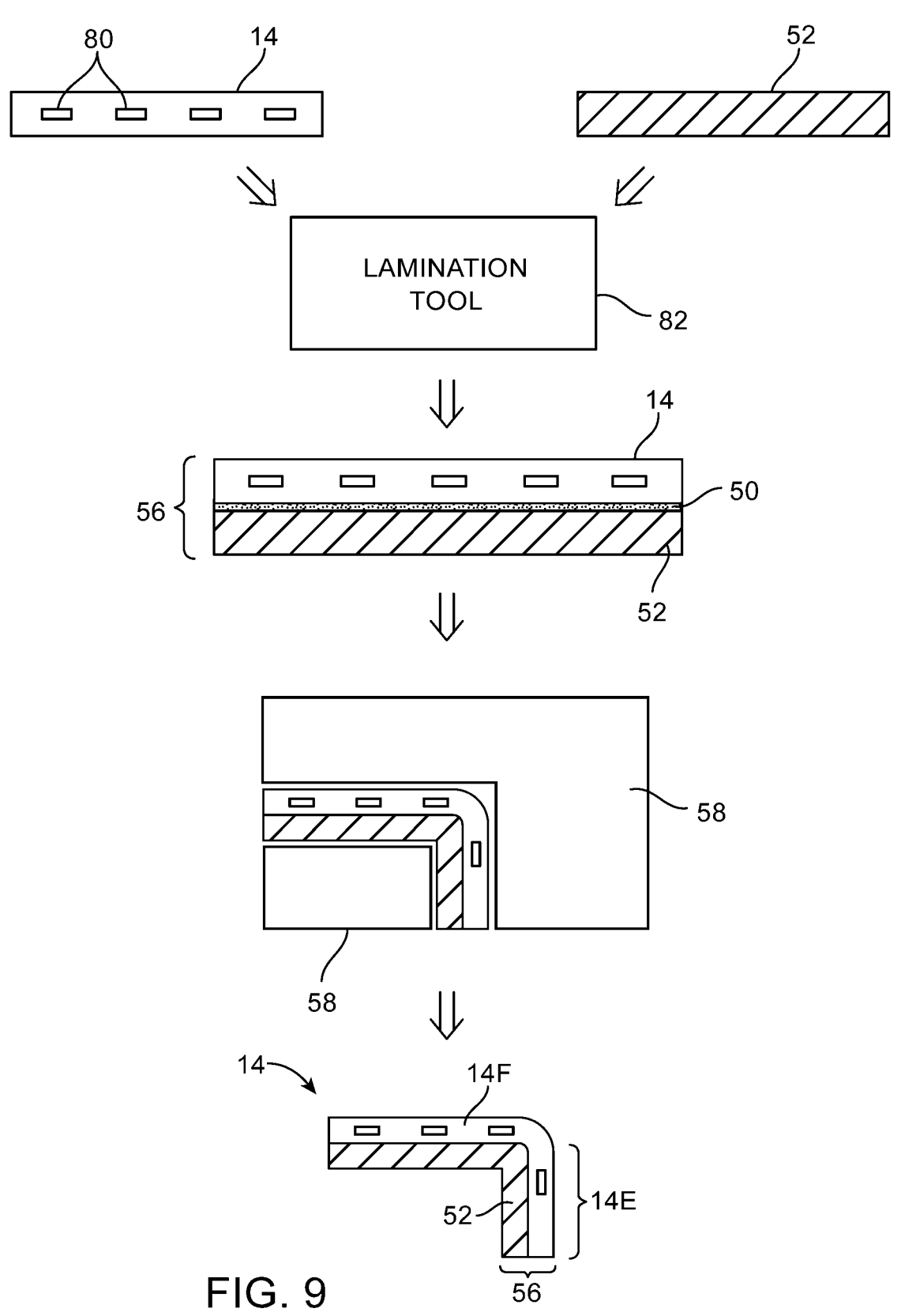
FIG. 9 is a diagram showing how a flexible display and support structure may be bent to form a bent border in accordance with an embodiment of the present invention.

FIG. 9 shows equipment and techniques that may be used in forming a display with a bent edge. With the illustrative arrangement of FIG. 9, display 14 may include display structures formed on a flexible substrate such as a flexible layer of polyimide or other polymer. Display 14 may be, for example, a flexible display layer such as a flexible organic light-emitting diode display having organic light-emitting-diode display pixels such as display pixels 80.

Equipment such as lamination tool 82 may use adhesive such as adhesive 50 or other attachment mechanisms to attach flexible display 14 to support layer 52. Support layer 52 may be formed from polymer or other suitable material. With one suitable arrangement, support layer 52 may be formed from a flexible sheet of one or more materials (e.g., a polymer sheet having a thickness of about 0.3 to 1.5 mm). A stiffener such as a thin sheet of metal, ceramic, glass, plastic, or other material may, if desired, be incorporated into some of layer 52 (e.g., in a rectangular region under planar portion 14F of display 14). As described in connection with FIG. 5, the material of support layer 52 may be formed from a polymer that softens at lower temperatures than the materials of display 14 (e.g., the polyimide substrate of display 14).

Layer 56 (e.g., a layer that includes flexible display 14 and support layer 52) may be heated and bent into a desired shape using heated bending equipment 58 to produce a display such as display 14 having a planar portion 14F and bent edge portion 14E. Display 14 may be attached to additional device structures (e.g., housing structures and other support structures) following bending of display 14 into a shape of the type shown in FIG. 9.

Figure 10:
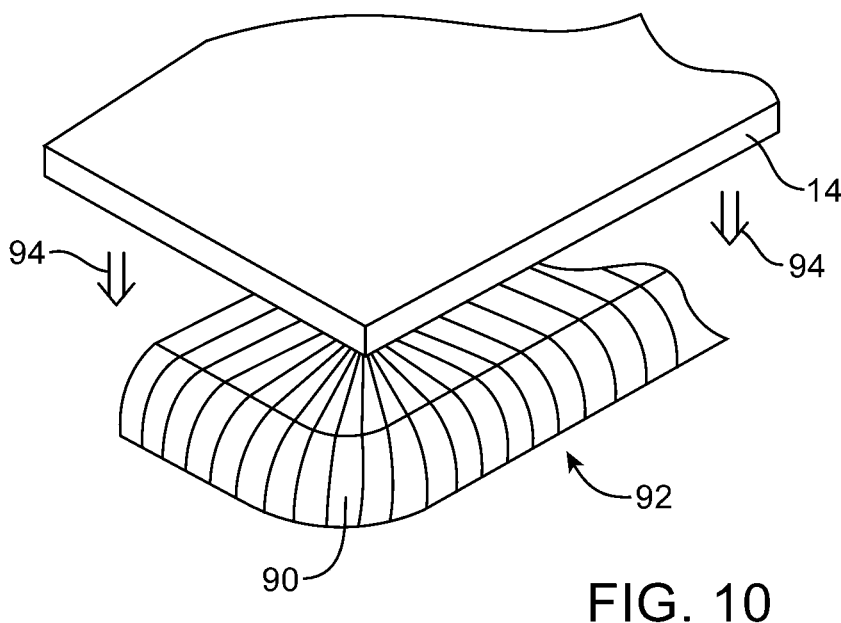
FIG. 10 is a perspective view of flexible display structures and associated support structures with rounded corners in accordance with an embodiment of the present invention.
Figure 11:
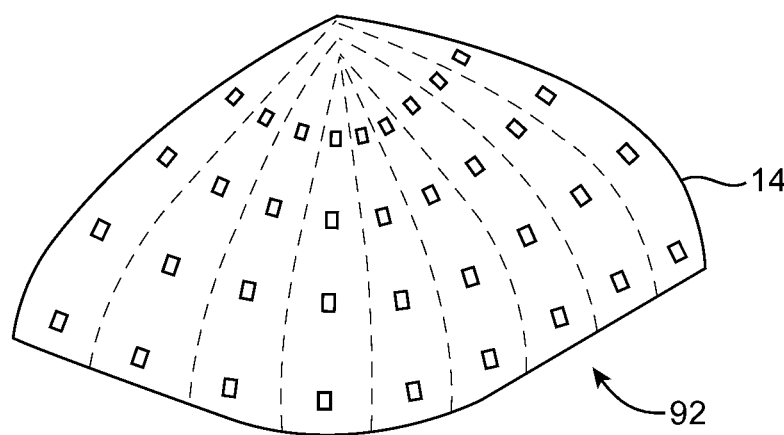
FIG. 11 is a perspective view of a flexible display of the type shown in FIG. 10 following conformal attachment of the flexible display to the rounded corner of the support structures in accordance with an embodiment of the present invention.

If desired, display 14 may be heated sufficiently that display 14 becomes flexible enough to fit over surfaces with compound curves. FIG. 10 is a perspective view showing how flexible display 14 may be planar before heat and pressure are applied. The surface to which it is desired to attach flexible display 14 such as rounded corner surface 90 of structure 92 in FIG. 10 may have compound curves. By heating the flexible display layers (e.g., a display layer or a layer such as layer 56 that optionally includes a display layer supported by support structure layer 52), the display may be pressed in direction 94 (FIG. 10) to form a shape that conforms to the rounded corner surface of structure 92, as shown in FIG. 11. In this configuration, display pixels 80 in display 14 may cover the rounded corner surface and curved sidewalls of structure 92 (as an example). Structures such as structure 92 may be formed from housing structures or other support structures in device 10.

Figure 12:
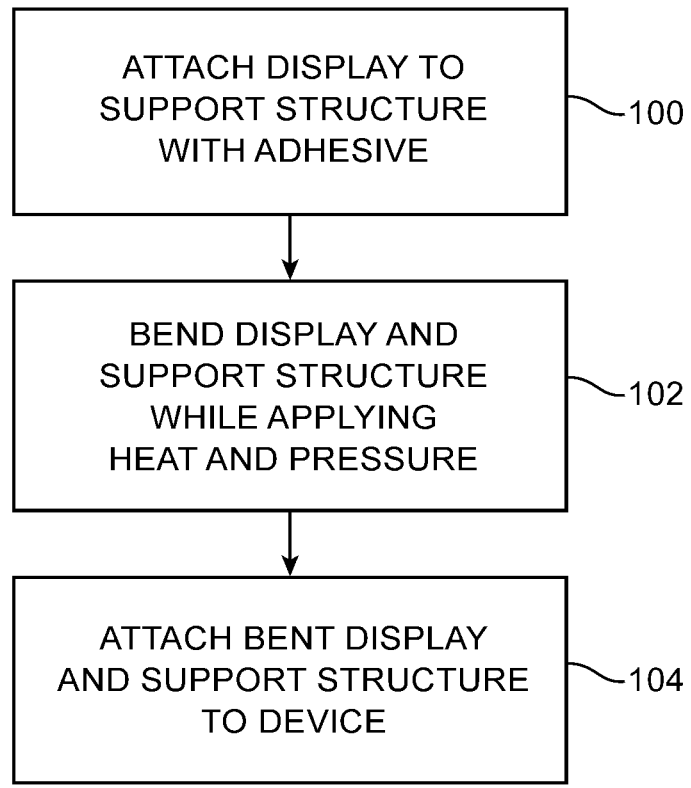
FIG. 12 is a flow chart of illustrative steps involved in using equipment that applies heat and pressure in the process of bending an edge of a display in accordance with an embodiment of the present invention.

Illustrative steps involved in forming electronic devices having displays with bends are shown in FIG. 12. At step 100, flexible display 14 may be attached to optional support layer 52 using adhesive 50. For example, equipment such as lamination tool 82 of FIG. 9 may be used to attach display 14 to support layer 52 to form layer 56.

At step 102, layer 56 (e.g., display layer 14, optional adhesive layer 50, and optional support layer 52) may be bent. For example, equipment 58 (e.g., heated block structures of the type shown in FIGS. 7 and 8) may be use to bend edge portion 14E of display 14 at a non-zero angle with respect to portion 14F. During the application of pressure to bend layer 56, equipment 58 may apply global or localized heat to layer 56. For example, in an environment in which room temperature is 20° C., equipment 58 may be used to apply sufficient heat to bend 14B of display 14 and associated portions of support layer 52 to allow layer 56 to flex at bend 14B and thereby form bent edge 14E.

At step 104, the bent version of display 14 (e.g., the bent version of layer 56) may be attached to support structures and installed in device 10. If desired, the operations associated with attaching the bent display into device 10 may be performed at the same time as the heating and bending operations of step 102. For example, equipment 58 may be used to compress display 14 (layer 56) onto a housing structure or other support structure while heat is being applied, thereby simultaneously heating, bending, and attaching display 14 and layer 56 in a conformal layer on the surface of the housing support structure or other support structure.

The foregoing is merely illustrative of the principles of this invention and various modifications can be made by those skilled in the art without departing from the scope and spirit of the invention.

What is claimed is:

1. An electronic device having a front and a rear, the electronic device comprising:

a housing wall at the rear;

a display having a flexible display panel with pixels at the front;

a printed circuit board between the housing wall and the flexible display panel; and electrical components mounted on the printed circuit board, wherein the flexible display panel has four edges that are joined at four rounded corners, wherein the flexible display panel is bent away from the front towards the rear along the four edges, wherein each of the four rounded corners includes some of the pixels, extends between a respective two of the four edges, and is bent away from the front towards the rear, and wherein the respective two of the four edges are perpendicular to each other.

2. The electronic device defined in claim 1, wherein the flexible display panel has a planar front portion, wherein the flexible display panel is bent relative to the planar front portion along the four edges, and wherein each of the four rounded corners is bent relative to the planar front portion.

3. The electronic device defined in claim 1, further comprising:

a housing that includes the housing wall, wherein the display is coupled to the housing.

4. The electronic device defined in claim 3, wherein the housing includes curved sidewalls that extend from the housing wall from the rear towards the front.

5. The electronic device defined in claim 4, wherein the housing wall is a planar rear housing wall.

6. The electronic device defined in claim 3, wherein the housing is formed from glass.

7. The electronic device defined in claim 3, wherein the electronic device has an exterior surface and wherein the housing forms the exterior surface.

8. The electronic device defined in claim 1, wherein each of the four rounded corners has compound curves.

9. The electronic device defined in claim 1, wherein the electronic device has first and second opposing ends, the electronic device further comprising:

a speaker port at the first end.

10. An electronic device comprising:

a housing;

a display that is coupled to the housing and that includes pixels;

a printed circuit board mounted in the housing; and electrical components mounted on the printed circuit board, wherein the display includes a flexible display panel that has four rounded corners and four edges that each extend between a respective two of the rounded corners, wherein the four rounded corners and the four edges include some of the pixels, and wherein the flexible display panel is bent downwards along the four edges and in the four rounded corners.

11. The electronic device defined in claim 10, wherein the flexible display panel has a planar front portion, wherein each of the four edges is bent relative to the planar front portion, and wherein each of the four rounded corners is bent relative to the planar front portion.

12. The electronic device defined in claim 10, wherein the electronic device has an exterior surface and wherein the housing forms the exterior surface.

13. The electronic device defined in claim 10, wherein the electronic device has first and second opposing ends, wherein the flexible display panel extends between the first and second ends, and wherein the electronic device further comprises:

a speaker port at the first end.

14. The electronic device defined in claim 10, wherein the housing includes a rear housing wall and curved sidewalls that extend from the rear housing wall.

15. The electronic device defined in claim 14, wherein the printed circuit board is interposed between the rear housing wall and the flexible display panel.

16. An electronic device having first and second opposing ends and an exterior surface, the electronic device comprising:

a housing that forms the exterior surface;

a speaker port at the first end; and a display having a flexible display panel with pixels, wherein the flexible display panel is coupled to the housing, extends between the first and second ends, and comprises:

a first bent edge portion that includes some of the pixels of the flexible display panel;

a second bent edge portion that extends perpendicular to the first bent edge portion and that includes some of the pixels of the flexible display panel; and a bent corner portion that includes some of the pixels of the flexible display panel and that extends between the first and second bent edge portions, wherein the flexible display panel comprises a planar front portion, wherein the first bent edge portion is bent relative to the planar front portion, wherein the second bent edge portion is bent relative to the planar front portion, and wherein the bent corner portion is bent relative to the planar front portion.

17. The electronic device defined in claim 16, wherein the electronic device has a front and a rear, wherein the flexible display panel is formed at the front and wherein the housing has a housing wall at the rear.

18. The electronic device defined in claim 17, wherein the first bent edge portion, the second bent edge portion, and the bent corner portion are bent away from the front towards the rear.

19. The electronic device defined in claim 16, wherein the first bent edge portion, the second bent edge portion, and the bent corner portion are bent towards a rear of the electronic device.

* * * * *